United States Patent
Byun et al.

(10) Patent No.: US 12,129,348 B2
(45) Date of Patent: *Oct. 29, 2024

(54) HARD COATING FILM

(71) Applicant: LG CHEM, LTD., Seoul (KR)

(72) Inventors: Jin Seok Byun, Daejeon (KR); Byung Joon Chae, Daejeon (KR); Jae Young Kim, Daejeon (KR); Yeong Rae Chang, Daejeon (KR); Yun U Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 592 days.

This patent is subject to a terminal disclaimer.

(21) Appl. No.: 16/781,256

(22) Filed: Feb. 4, 2020

(65) Prior Publication Data
US 2020/0172689 A1  Jun. 4, 2020

Related U.S. Application Data

(63) Continuation-in-part of application No. PCT/KR2018/009112, filed on Aug. 9, 2018.

(30) Foreign Application Priority Data

Sep. 15, 2017  (KR) .................. 10-2017-0118862

(51) Int. Cl.
*C08J 7/04* (2020.01)
*B32B 3/30* (2006.01)
(Continued)

(52) U.S. Cl.
CPC .............. *C08J 7/0427* (2020.01); *C08K 3/36* (2013.01); *C09D 4/00* (2013.01); *C09D 7/61* (2018.01);
(Continued)

(58) Field of Classification Search
CPC .................................. C09D 4/00; C09D 7/61
See application file for complete search history.

(56) References Cited

U.S. PATENT DOCUMENTS 4,715,986 A * 12/1987 Gruning ............... B01D 17/047
428/407
5,104,929 A * 4/1992 Bilkadi .................... C09D 4/00
524/847
(Continued)

FOREIGN PATENT DOCUMENTS

CA     2996403 A1    4/2017
CN  101475774 A     7/2009
(Continued)

OTHER PUBLICATIONS

PCT Search Report & Written Opinion issued for PCT Application No. PCT/KR2018/010870 on Jan. 17, 2019, 12 pages.
(Continued)

*Primary Examiner* — Vivian Chen
(74) *Attorney, Agent, or Firm* — ROTHWELL, FIGG, ERNST & MANBECK, P.C.

(57) ABSTRACT

A hard coating film comprising a base layer including: a polymer binder resin; first inorganic particles dispersed in the polymer binder resin and having an average particle size of 5 nm or more and less than 70 nm; and second inorganic particles which are dispersed in the polymer binder resin and have an average particle size of 70 nm to 150 nm is provided.

10 Claims, 1 Drawing Sheet

(51) Int. Cl.
    *B32B 7/02*     (2019.01)
    *B32B 27/20*    (2006.01)
    *B32B 27/30*    (2006.01)
    *C08J 7/046*    (2020.01)
    *C08K 3/22*     (2006.01)
    *C08K 3/36*     (2006.01)
    *C08K 9/04*     (2006.01)
    *C08K 9/06*     (2006.01)
    *C09D 4/00*     (2006.01)
    *C09D 7/40*     (2018.01)
    *C09D 7/61*     (2018.01)
    *C09D 7/62*     (2018.01)
    *G02B 1/14*     (2015.01)

(52) U.S. Cl.
    CPC . *B32B 3/30* (2013.01); *B32B 7/02* (2013.01); *B32B 27/20* (2013.01); *B32B 27/308* (2013.01); *C08J 7/046* (2020.01); *C08K 3/22* (2013.01); *C08K 9/04* (2013.01); *C08K 9/06* (2013.01); *C08K 2201/005* (2013.01); *C08K 2201/011* (2013.01); *C08K 2201/014* (2013.01); *C09D 7/62* (2018.01); *C09D 7/67* (2018.01); *C09D 7/68* (2018.01); *G02B 1/14* (2015.01)

(56) References Cited

U.S. PATENT DOCUMENTS

| | | | |
|---|---|---|---|
| 10,954,409 B2* | 3/2021 | Byun | C08J 7/0427 |
| 2002/0001710 A1* | 1/2002 | Kang | C08F 222/185 |
| | | | 427/515 |
| 2004/0032546 A1 | 2/2004 | Ito | |
| 2004/0071937 A1 | 4/2004 | Chien et al. | |
| 2005/0070632 A1 | 3/2005 | Chien et al. | |
| 2005/0123762 A1* | 6/2005 | Ori | C08K 3/22 |
| | | | 428/407 |
| 2007/0238088 A1* | 10/2007 | Rubinsztajn | B01J 13/0047 |
| | | | 435/325 |
| 2007/0260008 A1* | 11/2007 | Saito | C08K 3/36 |
| | | | 524/547 |
| 2008/0070140 A1* | 3/2008 | Fomitchev | G03G 9/09716 |
| | | | 430/137.1 |
| 2008/0153922 A1 | 6/2008 | Noguchi et al. | |
| 2010/0104858 A1* | 4/2010 | Horio | C08J 7/0427 |
| | | | 524/493 |
| 2010/0112296 A1 | 5/2010 | Yoshihara et al. | |
| 2010/0124631 A1* | 5/2010 | Horio | G02B 1/14 |
| | | | 427/508 |
| 2010/0143674 A1 | 6/2010 | Yoshihara et al. | |
| 2010/0167068 A1 | 7/2010 | Horio | |
| 2011/0151146 A1* | 6/2011 | Okano | G02B 5/3025 |
| | | | 359/488.01 |
| 2012/0251778 A1* | 10/2012 | Shimano | C09D 7/62 |
| | | | 428/323 |
| 2012/0270027 A1* | 10/2012 | Hwang | C09D 4/00 |
| | | | 428/220 |
| 2013/0115469 A1 | 5/2013 | Hayashi et al. | |
| 2013/0122253 A1 | 5/2013 | Yoshihara et al. | |
| 2013/0251948 A1 | 9/2013 | Lyons et al. | |
| 2013/0302594 A1* | 11/2013 | Sugiyama | G02B 1/14 |
| | | | 428/323 |
| 2014/0011954 A1* | 1/2014 | Tokoro | C09D 7/62 |
| | | | 556/412 |
| 2015/0086777 A1* | 3/2015 | Abe | C08F 220/1811 |
| | | | 428/483 |
| 2015/0132552 A1 | 5/2015 | Kang et al. | |
| 2015/0139259 A1 | 5/2015 | Robinson | |
| 2015/0203711 A1 | 7/2015 | Kang et al. | |
| 2015/0252210 A1 | 9/2015 | Kang et al. | |
| 2016/0115340 A1 | 4/2016 | Hashimoto et al. | |
| 2016/0326383 A1* | 11/2016 | Pokorny | C09D 7/62 |
| 2017/0059982 A1 | 3/2017 | Watanabe et al. | |
| 2018/0208793 A1* | 7/2018 | Kim | C09D 175/06 |
| 2018/0231688 A1 | 8/2018 | Byun et al. | |
| 2018/0364396 A1 | 12/2018 | Jang et al. | |
| 2018/0372917 A1 | 12/2018 | Kim | |

FOREIGN PATENT DOCUMENTS

| | | | |
|---|---|---|---|
| CN | 103013205 A | | 4/2013 |
| CN | 104487497 A | | 4/2015 |
| CN | 104736609 A | | 6/2015 |
| CN | 106462048 A | | 2/2017 |
| CN | 107360718 A | | 11/2017 |
| CN | 108025526 A | | 5/2018 |
| EP | 1 491 917 A | * | 12/2004 |
| JP | 2004-139013 A | | 5/2004 |
| JP | 2009-132880 A | | 6/2009 |
| JP | 2009-163260 A | | 7/2009 |
| JP | 2010-085985 A | | 4/2010 |
| JP | 2010-102123 A | | 5/2010 |
| JP | 2010-241937 A | | 10/2010 |
| JP | 2012-066477 A | | 4/2012 |
| JP | 2012-173627 A | | 9/2012 |
| JP | 5103824 B2 | | 12/2012 |
| JP | 2013-020985 A | | 1/2013 |
| JP | 2013-156638 A | | 8/2013 |
| JP | 2014-148114 A | | 8/2014 |
| JP | 2014-163007 A | | 9/2014 |
| JP | 2015-067682 A | | 4/2015 |
| JP | 2015-108826 A | | 6/2015 |
| JP | 2016-001320 A | | 1/2016 |
| JP | 2017-042967 A | | 3/2017 |
| JP | 2017-080951 A | | 5/2017 |
| JP | 2017-139061 A | | 8/2017 |
| KR | 10-0785380 B1 | | 12/2007 |
| KR | 10-2010-0073365 A | | 7/2010 |
| KR | 10-2010-0124477 A | | 11/2010 |
| KR | 10-2011-0013547 A | | 2/2011 |
| KR | 10-2013-0077185 A | | 7/2013 |
| KR | 10-1342267 B1 | | 12/2013 |
| KR | 10-2014-0101954 A | | 8/2014 |
| KR | 10-1532545 B1 | | 6/2015 |
| KR | 10-2015-0092202 A | | 8/2015 |
| KR | 10-2015-0136179 A | | 12/2015 |
| KR | 10-2017-0052479 A | | 5/2017 |
| KR | 10-2017-0065459 A | | 6/2017 |
| KR | 10-2017-0084939 A | | 7/2017 |
| WO | WO 02/12404 A | * | 2/2002 |
| WO | 2008-123257 A1 | | 10/2008 |
| WO | 2012-066743 A1 | | 5/2012 |
| WO | 2013-146477 A1 | | 10/2013 |
| WO | 2015-080132 A1 | | 6/2015 |
| WO | 2017-073316 A1 | | 5/2017 |
| WO | 2019-054806 A1 | | 3/2019 |

OTHER PUBLICATIONS

PCT Search Report & Written Opinion issued for PCT Application No. PCT/KR2018/009112 on Mar. 19, 2019, 10 pages.

Extended European Search Report issued for corresponding European Patent Application No. 18855911.6. on Jun. 22, 2020, 10 pages.

* cited by examiner

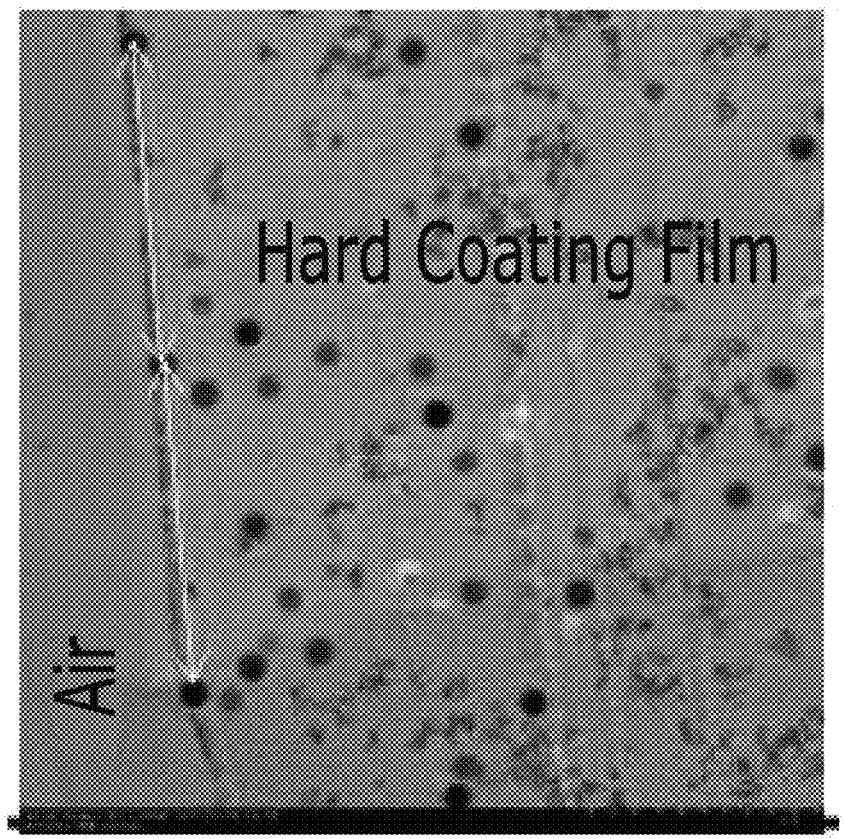

HARD COATING FILM

CROSS-REFERENCE TO RELATED APPLICATION(S)

The present application is a Continuation-in-part of International Application No. PCT/KR2018/009112, filed on Aug. 9, 2018, which claims priority from, Korean Patent Application No. 10-2017-0118862, filed on Sep. 15, 2017, the entire content of which are fully incorporated herein by reference.

TECHNICAL FIELD

The present invention relates to a hard coating film used for the purpose of protecting the surface of a display, etc.

BACKGROUND ART

An image display surface in an image display device such as a liquid crystal display, a CRT display, a projection display, a plasma display, an electroluminescence display, etc. is required to be provided with scratch resistance in order to prevent appearance of scratches during handling. Therefore, improvement of scratch resistance of the image display surface in the image display device is generally achieved by forming a hard coating film on a base film or by using a hard coating film (optical laminate) which is additionally provided with optical functions such as an anti-reflective property, an anti-glare property, etc.

During a winding process of the hard coating film using a roll, a distance between hard coating films becomes small, and in an extreme case, a blocking phenomenon occurs in which the hard coating films adhere to each other. When the hard coating films that strongly adhere to each other are fed to travel on a line, the films are scratched when the films are peeled from the wound roll, or the films are scratched due to the fluttering while travelling on the line or at the time of being in contact with a guide roll. This may cause a large decrease in yield.

Several methods have been proposed to prevent hard coating films from being scratched by applying an anti-blocking function to the surface of the hard coating film. For example, in order to prevent blocking, a technique of forming unevenness on the surface of the hard coating film by phase separation of an oligomer and a monomer was proposed. A technique of forming unevenness by adding particles into the hard coating film was also proposed in order to secure an anti-blocking property. However, with these known methods of forming unevenness, it is difficult to control uniform formation of unevenness. Therefore, coarse unevenness may be provided to cause drawbacks on the appearance, or when the unevenness is insufficiently formed, anti-blocking performance may be poor.

DISCLOSURE

Technical Problem

The present invention provides a hard coating film having excellent optical properties and an anti-blocking function while maintaining excellent physical properties.

Technical Solution

According to an embodiment of the present invention, a hard coating film including a base layer including: a polymer binder resin; first inorganic particles which are dispersed in the polymer binder resin and have an average particle size of 5 nm or more and less than 70 nm; and second inorganic particles which are dispersed in the polymer binder resin and have an average particle size of 70 nm to 150 nm, is provided, wherein a content of the second inorganic particles having an average particle size of 70 nm to 150 nm is 4% by weight to 12% by weight, and with regard to at least two of the second inorganic particles, a distance between one surface of the base layer and the center of the second inorganic particle in a direction perpendicular to one surface of the base layer may be 35 nm to 5.0 µm, and the at least two second inorganic particles may be adjacent to each other in a horizontal direction to one surface of the base layer while being spaced apart by a distance of 0.1 µm to 1.5 µm.

Hereinafter, a hard coating film according to specific embodiments of the present invention will be described in more detail.

In the present invention, the term "first", "second", or the like is used to de scribe a variety of components, and these terms are merely employed to differentiate one component from other components.

Further, (meth)acrylate covers both acrylate and methacrylate.

In addition, a fluorine-based compound refers to a compound containing at least one fluorine atom in the compound.

According to an embodiment of the present invention, a hard coating film including: a base layer including a polymer binder resin; first inorganic particles which are dispersed in the polymer binder resin and have an average particle size of 5 nm or more and less than 70 nm; and second inorganic particles which are dispersed in the polymer binder resin and have an average particle size of 70 nm to 150 nm, is provided, wherein a content of the second inorganic particles having an average particle size of 70 nm to 150 nm is 4% by weight to 12% by weight, and with regard to at least two of the second inorganic particles, a distance between one surface of the base layer and the center of the second inorganic particle in a direction perpendicular to one surface of the base layer may be 35 nm to 5.0 µm, and the at least two second inorganic particles may be adjacent to each other in a horizontal direction to one surface of the base layer while being spaced apart by a distance of 0.1 µm to 1.5 µm.

Previously, in order to prevent blocking of the hard coating film, a method of forming unevenness on the surface thereof was known, but there was a problem that it is difficult to control formation of uniform unevenness.

Accordingly, the present inventors conducted studies on hard coating films, and they found that when two kinds of inorganic particles having different average particle sizes are dispersed in a polymer binder resin, and a content of second inorganic particles having an average particle size of 70 nm to 150 nm of the two kinds of inorganic particles is controlled at 4% by weight to 12% by weight, the dispersed second inorganic particles do not agglomerate and thus uniform unevenness is formed to exhibit an anti-blocking function, and the hard coating film has excellent physical properties and optical properties, thereby completing the present invention.

In particular, the hard coating film of the embodiment may include a predetermined amount of the second inorganic particles, together with the first inorganic particles, and thus it may have a low haze value and high light transmittance while having intrinsic uniform surface properties, thereby achieving the anti-blocking function.

More specifically, the content of the second inorganic particles is 4% by weight to 12% by weight, 5% by weight to 11% by weight, or 6% by weight to 9% by weight. When the base layer included in the hard coating film includes the above-described amount of the second inorganic particles, the second inorganic particles do not agglomerate, and particularly, the second inorganic particles which are located close to the surface of the base layer are uniformly distributed without agglomeration, thereby forming uniform unevenness. As a result, the hard coating film including the base layer may exhibit an excellent anti-blocking function.

With regard to at least two of the second inorganic particles included in the base layer, the distance between one surface of the base layer and the center of the second inorganic particle in a direction perpendicular to one surface of the base layer may be 35 nm to 5.0 µm. In this regard, the center of the second inorganic particle means a middle point of the particle diameter of the second inorganic particle.

As mentioned above, since the particle diameter of the second inorganic particle is 70 nm to 150 nm, a lower limit of the radius of the second inorganic particle may be 35 nm. Therefore, since the distance between one surface of the base layer and the center of the second inorganic particle is controlled to 35 nm or more, the second inorganic particles may be placed close to the surface of the base layer.

Further, since the distance between one surface of the hard coating film and the center of the second inorganic particle is controlled to 35 nm or more, the respective second inorganic particles may be placed only inside the hard coating film, which means that all of the individual second inorganic particles are distributed inside the hard coating film, and more specifically, means that not even a part of the second inorganic particles may be exposed to the outside of the hard coating film.

Meanwhile, if the second inorganic particle touches the surface of the base layer, for example, if the distance from one surface of the base layer to the center of the second inorganic particle is equal to the radius of the second inorganic particle, it may be considered that the second inorganic particle is substantially not exposed to the outside of the base layer.

The at least two second inorganic particles, in which the distance between one surface of the base layer and the center of the particle in a direction perpendicular to one surface of the base layer is 35 nm to 5.0 µm, may push up the binder resin to form unevenness on one surface of the hard coating film. Further, as mentioned above, since the second inorganic particles do not agglomerate, coarsening of the size of unevenness which is formed by the second inorganic particles does not occur to constantly control the size and distribution of unevenness.

The at least two second inorganic particles, in which the distance between one surface of the base layer and the center of the particle in a direction perpendicular to one surface of the base layer is 35 nm to 5.0 µm, may be adjacent to each other in a horizontal direction to one surface of the base layer while being spaced apart by a distance of 0.1 µm to 1.5 µm. The distance of the second inorganic particles which are adjacent to each other in a horizontal direction to one surface of the base layer means an average of the distance between the center of one second inorganic particle and the center of another neighboring second inorganic particle. In particular, since the average particle size of the second inorganic particle is 70 nm to 150 nm, and the average distance between the centers of the second inorganic particles which are adjacent to each other in a horizontal direction to one surface of the base layer is at least 100 nm or more, the second inorganic particles may not be in contact with each other, and furthermore, agglomeration between the second inorganic particles may not occur.

When the average distance between the second inorganic particles is less than 100 nm, haze of the hard coating film including the base layer increases to generate a problem that the surface thereof looks hazy. When the average distance is more than 1.5 µm, the anti-blocking property of the hard coating film may be deteriorated.

FIG. 1 is a cross-sectional TEM (transmission electron microscope) image of a hard coating film composed of only a base layer according to an embodiment of the present invention at 2500× magnification. According to this image, two or more of all the second inorganic particles are placed close to the surface (base layer) of the hard coating film. Further, an arrow in FIG. 1 indicates a method of measuring a distance between the second inorganic particles which are adjacent to each other in a horizontal direction to one surface of the hard coating film (base layer). The shortest distance between the second inorganic particles which are adjacent to each other, as measured by the method, may be 450 nm to 1.7 µm, 480 nm to 1.6 µm, or 500 nm to 1.5 µm, and an average of the shortest distances is 500 nm to 1.5 µm, as mentioned above.

At least one surface of the base layer may have two or more unevennesses. A height of the unevenness formed on the base layer may be 1 nm to 50 nm, 5 nm to 45 nm, 10 nm to 40 nm, or 15 nm to 30 nm. When the height of the unevenness is less than 1 nm, sufficient unevenness is not formed on the surface of the base layer, and thus the hard coating film including the base layer may not exhibit the anti-blocking function. When the height of the unevenness is more than 50 nm, there is a problem that haze is generated.

Meanwhile, an average distance between the unevennesses formed on the base layer may be 0.1 µm to 1.5 µm, 0.2 µm to 1.2 µm, or 0.5 µm to 1.0 µm. The average distance between the unevennesses means an average value of the distances from the center of one unevenness to the center of the other neighboring unevenness. When the average distance between the unevennesses is less than 0.1 µm, haze is generated due to agglomeration between the second inorganic particles, and when the average distance between the unevennesses is more than 1.5 µm, the space between the unevennesses on the surface of the base layer is too large, and thus the anti-blocking function may not be obtained.

The base layer includes two kinds of first inorganic particles having different average particle sizes. First, the first inorganic particle has an average particle size of 5 nm or more and less than 70 nm, 10 nm to 40 nm, or 15 nm to 30 nm. When the average particle size of the first inorganic particle is less than 5 nm, hardness of the hard coating film including the base layer may become weak.

Meanwhile, an average particle size of the second inorganic particle is 70 nm to 150 nm, 75 nm to 140 nm, or 80 nm to 135 nm. When the average particle size of the second inorganic particle is less than 70 nm, unevenness with a sufficient size may not be formed, and thus the anti-blocking property may not be obtained.

The first inorganic particle and the second inorganic particle may be one or more selected from the group consisting of silica and a metal oxide, and the metal oxide means a metal oxide excluding silica which is a metalloid oxide.

A content of the first inorganic particle may be 1% by weight to 30% by weight with respect to 100% by weight of the base layer.

Meanwhile, a reactive functional group or a compound containing the reactive functional group may be introduced onto the surfaces of the first inorganic particle and the second inorganic particle, respectively. The reactive functional group may include various functional groups which are known to participate in polymerization by stimulation such as light, heat, etc. Specific examples of the reactive functional group may include a (meth)acrylate group, an epoxide group, a vinyl group, or a thiol group.

Further, the compound containing the reactive functional group may be introduced onto the surfaces of the first inorganic particle and the second inorganic particle, respectively, and examples of the compound containing the reactive functional group may include a silane compound or a hydroxide compound containing the reactive functional group.

For example, the silane compound containing the reactive functional group may include vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, etc. These compounds may be used alone or in a mixture of two or more thereof.

Since the reactive functional group or the compound containing the reactive functional group is introduced onto the surfaces of the first inorganic particle and the second inorganic particle, respectively, the reactive functional group may form a crosslinking bond with the polymer binder resin during the formation of the base layer, and the particles are well dispersed in the binder resin. In contrast, when the particles have no reactive functional groups, the particles agglomerate with each other. Accordingly, the hard coating film finally manufactured may have improved mechanical properties and anti-blocking property without haze generation.

The base layer may include the polymer binder resin including one or more selected from the group consisting of an acrylic resin, an epoxy group, a vinyl group, and a thiol group.

The base layer may further include a fluorine-based compound containing the reactive functional group, and the fluorine-based compound containing the reactive functional group may form a crosslinking bond with the polymer binder resin. The reactive functional group contained in the fluorine-based compound may be the same as or different from the reactive functional group which is introduced into the first inorganic particle and the second inorganic particle. For example, the reactive functional group contained in the fluorine-based compound may be a (meth)acrylate group, an epoxide group, a vinyl group, or a thiol group, or a silane compound or a hydroxide compound containing the (meth)acrylate group, the epoxide group, the vinyl group, or the thiol group.

The at least two second inorganic particles, in which the distance between one surface of the base layer and the center of the particle in a direction perpendicular to one surface of the base layer is 35 nm to 5.0 µm, may push up the binder resin, thereby forming unevenness on one surface of the base layer. In particular, since the second inorganic particles do not agglomerate, it is possible to obtain a base layer having unevenness which is uniformly formed on the surface thereof.

A thickness of the base layer may be 500 nm to 30 µm, 1 µm to 25 µm, 5 µm to 20 µm, or 8 µm to 15 µm. When the thickness of the base layer is less than 500 nm, hardness of the hard coating film including the base layer may be deteriorated, and when the thickness is more than 30 µm, the hard coating film severely curls, resulting in poor processability.

A maximum amplitude (A) of the base layer based on average friction force may be 0.15 or less, in a graph of measurements of a friction force with a TAC film which is measured by applying a load of 400 g to the surface thereof.

The friction force measurement graph of the base layer may be obtained by contacting a TAC film with the surface of the base layer, putting a sled with a load of 400 g thereon, and then measuring a friction force while moving the sled for a specific distance at a constant test speed. In this regard, the friction force measurement graph is obtained as a friction force (y-axis) with respect to the test distance (x-axis), and the test distance is divided into a static test distance section and a kinetic test distance section. In this regard, the static test distance is a section for measuring a static friction force, and the static friction force is defined as a friction force measured at a distance from the beginning of the measurement to 3 cm. Further, the kinetic test distance is a section for measuring a kinetic friction force, and is determined as a mean value of the friction forces which are measured in the section in which the sled moves, specifically, the friction forces which are measured in the kinetic test distance section.

In the present invention, the maximum amplitude (A), which is measured in the kinetic test distance section of the test distance sections, means a maximum value of the absolute values of the differences between an average friction force and a maximum friction force or a minimum friction force after measuring the average friction force, the maximum friction force, and the minimum friction force in the kinetic test distance section.

Therefore, since a parameter for the maximum amplitude (A) is not measured from the starting point of the test distance but is measured for the difference between the average friction force and the maximum friction force or the minimum friction force at the kinetic test distance, it may serve as a measure for determining slipperiness of the base layer surface.

In the graph of measurements of the friction force with the TAC film which is measured by applying a load of 400 g to the surface of the base layer, the maximum amplitude (A) based on the average friction force may be 0.15 or less, 0.001 to 0.13, 0.005 to 0.10, 0.008 to 0.08, or 0.01 to 0.05. When the maximum amplitude (A) of the base layer based on the average friction force is more than 0.15, a blocking phenomenon may occur during a winding process of the hard coating film including the base layer using a roll.

Hereinafter, a method of manufacturing the hard coating film will be described, but the method of manufacturing the hard coating film is not limited thereto.

First, a composition for the base layer is prepared. The composition may include: photocurable and/or thermal curable monomers or oligomers; first inorganic particles having an average particle size of 5 nm to 50 nm and having a reactive functional group introduced onto the surface thereof; and second inorganic particles having an average particle size of 70 nm to 150 nm and having a reactive functional group introduced onto the surface thereof.

Next, the composition for the base layer is coated onto the transparent base film, followed by drying. A coating method is not particularly limited, as long as it is used to uniformly coat the film. A variety of methods, such as a spin coating method, a dipping method, a spraying method, a die coating method, a bar coating method, a roll coater method, a meniscus coating method, a flexo-printing method, a screen printing method, and a feed coater method, may be used. A drying method may be exemplified by vacuum drying or heat drying, or a combination thereof. For example, when a ketone-based solvent is used as a solvent, the drying process may be generally performed at a temperature ranging from room temperature to 80° C. or at a temperature ranging from 40° C. to 60° C. for 20 s to 3 min, or for 30 s to 1 min.

In this regard, the first inorganic particles and the second inorganic particles uniformly dispersed in the composition for the base layer are uniformly dispersed inside the base layer during the drying process, and in particular, there is no agglomeration between the second inorganic particles, in which the distance between one surface of the base layer and the center of the particle in a direction perpendicular to one surface of the base layer is 35 nm to 5.0 μm.

Thereafter, the coating film which was dried after being coated with the composition may be cured by light irradiation and/or heating. As a result, the photocurable and/or thermal curable monomers or oligomers are polymerized, and the first inorganic particles and the second inorganic particles may form crosslinking bonds with the photocurable and/or thermal curable monomers or oligomers, thereby forming the base layer. Accordingly, the second inorganic particles, in which the distance between one surface of the base layer and the center of the particle is 35 nm to 5.0 μm, may push up the binder resin to form unevenness on one surface of the base layer. Particularly, since the second inorganic particles do not agglomerate, it is possible to obtain the hard coating film including the base layer having unevenness which is uniformly formed on the surface thereof.

In the light irradiation, ultraviolet light, visible light, an electron beam, ionizing radiation, etc. may be mainly used. In the case of ultraviolet curing, ultraviolet rays emitted from a light source such as an ultra-high pressure mercury lamp, a high pressure mercury lamp, a low pressure mercury lamp, a carbon arc lamp, a xenon arc lamp, a metal halide lamp, etc. may be used. An irradiation dose of the light source is 50 mJ/cm$^2$ to 5000 mJ/cm$^2$ in terms of accumulative exposure at an ultraviolet wavelength of 365 nm. The heating may be generally performed at a temperature of 40° C. to 120° C. Alternatively, the reaction may be allowed by leaving the film at room temperature for 24 hours or more.

Advantageous Effects

According to the present invention, a hard coating film having excellent optical properties due to low haze and excellent anti-blocking function while maintaining excellent physical properties of scratch resistance, pencil hardness, etc., is provided.

BRIEF DESCRIPTION OF THE DRAWING

FIG. 1 is a cross-sectional transmission electron microscopic image of a hard coating film according to an embodiment of the present invention.

DETAILED DESCRIPTION OF THE EMBODIMENTS

The present invention will be described in more detail in the following examples. However, the following examples are for illustrative purposes only, and the content of the present invention is not intended to be limited thereby.

EXAMPLES AND COMPARATIVE EXAMPLES: MANUFACTURE OF HARD COATING FILM

Example 1

Solid components of 91 g of pentaerythritol triacrylate (PETA), 3 g of first silica particles having an average particle size of 23 nm (surface treatment: 3-methacryloyloxypropylmethyldimethoxysilane), 4 g of second silica particles having an average particle size of 132 nm (surface treatment: 3-methacryloyloxypropylmethyldimethoxysilane), 0.05 g of fluorine-based acrylate (RS-537, DIC), and 1.95 g of a photo-initiator (Irgacure 184, Ciba) were diluted in a MEK (methyl ethyl ketone) solvent at a solid concentration of 45% by weight to prepare a composition for a base layer.

A triacetyl cellulose film was coated with the composition using a #10 Mayer bar, dried at 60° C. for 1 minute, and irradiated with UV at a dose of 150 mJ/cm$^2$ to manufacture a hard coating film having a thickness of about 5 μm to about 6 μm.

Example 2

Solid components of 80 g of pentaerythritol triacrylate (PETA), 7 g of first silica particles having an average particle size of 15 nm (surface treatment: 3-methacryloyloxypropylmethyldimethoxysilane), 11 g of second silica particles having an average particle size of 110 nm (surface treatment: 3-methacryloyloxypropylmethyldimethoxysilane), 0.1 g of fluorine-based acrylate (RS-537, DIC), and 1.9 g of a photo-initiator (Irgacure 184, Ciba) were diluted in a MEK (methyl ethyl ketone) solvent at a solid concentration of 44% by weight to prepare a composition for a base layer.

A hard coating film was manufactured using the above composition in the same manner as in Example 1.

Example 3

Solid components of 85 g of pentaerythritol triacrylate (PETA), 4 g of first silica particles having an average particle size of 23 nm (surface treatment: 3-methacryloyloxypropylmethyldimethoxysilane), 9 g of second silica particles having an average particle size of 132 nm (surface treatment: 3-methacryloyloxypropylmethyldimethoxysilane), 0.05 g of fluorine-based acrylate (RS-537, DIC), and 1.95 g of a photo-initiator (Irgacure 184, Ciba) were diluted in a MEK (methyl ethyl ketone) solvent at a solid concentration of 44% by weight to prepare a composition for a base layer.

A hard coating film was manufactured using the above composition in the same manner as in Example 1.

Example 4

Solid components of 41.2 g of pentaerythritol triacrylate (PETA), 41.2 g of dipentaerythritol hexaacrylate (DPHA), 12 g of first silica particles having an average particle size of 15 nm (surface treatment: 3-methacryloyloxypropylmethyldimethoxysilane), 4 g of second silica particles having an average particle size of 82 nm (surface treatment: 3-methacryloyloxypropylmethyldimethoxysilane), 0.1 g of fluorine-based acrylate (RS-537, DIC), and 1.5 g of a photo-initiator (Irgacure 184, Ciba) were diluted in a MEK (methyl ethyl ketone) solvent at a solid concentration of 45% by weight to prepare a composition for a base layer.

A hard coating film was manufactured using the above composition in the same manner as in Example 1.

Example 5

Solid components of 91 g of pentaerythritol triacrylate (PETA), 3 g of first silica particles having an average particle size of 23 nm (surface treatment: 3-methacryloyloxypropylmethyldimethoxysilane), 4 g of second silica particles having an average particle size of 132 nm (surface treatment: 3-methacryloyloxypropylmethyldimethoxysilane), 0.05 g of fluorine-based acrylate (RS-537, DIC), and 1.95 g of a photo-initiator (Irgacure 184, Ciba) were diluted in a MEK (methyl ethyl ketone) solvent at a solid concentration of 45% by weight to prepare a composition for a base layer.

A hard coating film was manufactured using the above composition in the same manner as in Example 1.

Example 6

Solid components of 87 g of pentaerythritol triacrylate (PETA), 7 g of first silica particles having an average particle size of 15 nm (surface treatment: 3-methacryloyloxypropylmethyldimethoxysilane), 4 g of second silica particles having an average particle size of 110 nm (surface treatment: 3-methacryloyloxypropylmethyldimethoxysilane), 0.1 g of fluorine-based acrylate (RS-537, DIC), and 1.9 g of a photo-initiator (Irgacure 184, Ciba) were diluted in a MEK (methyl ethyl ketone) solvent at a solid concentration of 44% by weight to prepare a composition for a base layer.

A hard coating film was manufactured using the above composition in the same manner as in Example 1.

Example 7

Solid components of 89 g of pentaerythritol triacrylate (PETA), 4 g of first silica particles having an average particle size of 23 nm (surface treatment: 3-methacryloyloxypropylmethyldimethoxysilane), 5 g of second silica particles having an average particle size of 132 nm (surface treatment: 3-methacryloyloxypropylmethyldimethoxysilane), 0.05 g of fluorine-based acrylate (RS-537, DIC), and 1.95 g of a photo-initiator (Irgacure 184, Ciba) were diluted in a MEK (methyl ethyl ketone) solvent at a solid concentration of 44% by weight to prepare a composition for a hard coating film.

A hard coating film was manufactured using the above composition in the same manner as in Example 1.

Comparative Example 1

A composition and a hard coating film were prepared in the same manner as in Example 1, except that 1 g of the second silica particles and 93 g of pentaerythritol triacrylate (PETA) were used.

Comparative Example 2

A composition and a hard coating film were prepared in the same manner as in Example 1, except that 16 g of the second silica particles and 78 g of pentaerythritol triacrylate (PETA) were used.

Comparative Example 3

A composition and a hard coating film were prepared in the same manner as in Example 1, except that 13 g of the second silica particles and 81 g of pentaerythritol triacrylate (PETA) were used.

Comparative Example 4

A composition and a hard coating film were prepared in the same manner as in Example 5, except that 4 g of pentaerythritol triacrylate (PETA) was used instead of the second silica particles in Example 5.

Comparative Example 5

A composition and a hard coating film were prepared in the same manner as in Example 6, except that second silica particles having an average particle size of 200 nm were used instead of the second silica particles having an average particle size of 110 nm in Example 6.

Comparative Example 6

A composition and a hard coating film were prepared in the same manner as in Example 6, except that non-surface treated second silica particles were used in Example 6.

Comparative Example 7

A composition and a hard coating film were prepared in the same manner as in Example 6, except that second silica particles having an average particle size of 50 nm were used instead of the second silica particles having an average particle size of 110 nm in Example 6.

EXPERIMENTAL EXAMPLE: MEASUREMENT OF PHYSICAL PROPERTIES OF HARD COATING FILM

Experiments of the following items were performed with respect to the hard coating films obtained in the examples and comparative examples. Further, measurement results are shown in the following Table 1.

1. Measurement of Scratch Resistance

Each surface of the hard coating films obtained in the examples and comparative examples was doubly rubbed at a speed of 27 rpm 10 times with steel wool (#0000) under a load. The maximum load under which one or fewer scratches of 1 cm or less was observed with the naked eye was measured.

2. Measurement of Pencil Hardness

Pencil hardness of each of the hard coating films obtained in the examples and comparative examples was evaluated with a pencil tester in accordance with ASTM D3363.

3. Measurement of Haze

Haze was measured at three spots of each of the hard coating films obtained in the examples and comparative examples using HAZEMETER HM-150 of Murakami Color Research Laboratory in accordance with the JIS K7105 standard, and it was examined whether a mean value was 0.5 or less.

4. Measurement of Friction Force

A TAC (triacetyl cellulose) film was placed on the surface of each of the hard coating films obtained in the examples and comparative examples, and a friction force was measured for a total test distance of 10 cm at a test speed of 18 cm/min while applying a load of 400 g thereto. A graph for the friction force was obtained. Specifically, the friction force measurement graph was obtained by contacting the TAC film with the surface of the hard coating film, putting a sled with a load of 400 g thereon, and then measuring a friction force while pulling the sled for a total test distance of 10 cm at a test speed of 18 cm/min using a friction tester (FP-2260, manufactured by Thwing-Albert Instrument Company). Thereafter, an average friction force, a maximum friction force, and a minimum friction force were obtained in a kinetic test distance section in the obtained friction force measurement graph, and then a maximum value of the absolute values of the differences between the average friction force and the maximum friction force or the minimum friction force was defined as a maximum amplitude (A). In this regard, the static test distance is a section up to a test distance of 3 cm, and the kinetic test distance is a section from a test distance of 3 cm to a test distance of 10 cm.

5. Evaluation of Presence or Absence of Blocking Generation

A TAC film was placed on the surface of each of the hard coating films obtained in the examples and comparative examples, a weight of 3 kg was put thereon, and then left for 24 hours. Thereafter, it was examined whether the hard coating film and the TAC film adhered to each other.

6. Measurement of Average Distance between Second Inorganic Particles

The hard coating films obtained in the examples and comparative examples were photographed under a transmission electron microscope (TEM) at 2500× magnification, and based on the photographed image, a distance between the centers of the second inorganic particles which were placed close to the surface of the hard coating film (a distance between one surface of the base layer and the center of the second inorganic particle in a direction perpendicular to one surface of the base layer was 35 nm to 5.0 μm) was measured and an average value of the distances was calculated.

FIG. 1 is a cross-sectional TEM (transmission electron microscope) image of the hard coating film of the present invention at 2500× magnification. According to this image, at least three second inorganic particles showed that the distance between one surface of the base layer and the center of the second inorganic particle in a direction perpendicular to one surface of the hard coating film was 35 nm to 5.0 μm, and a length of an arrow which indicates the distance between the centers of the second inorganic particles was measured to determine the distance between the second inorganic particles. An average value of respective measurement values was calculated to determine an average distance between the second inorganic particles.

TABLE 1

| | Scratch resistance (g) | Pencil hardness | Haze | Maximum amplitude (A) | Blocking generation | Average distance between particles |
|---|---|---|---|---|---|---|
| Example 1 | 1000 | 3H | 0.1 | 0.04 | X | 1 μm |
| Example 2 | 1000 | 3H | 0.2 | 0.03 | X | 0.2 μm |
| Example 3 | 1000 | 3H | 0.3 | 0.04 | X | 0.35 μm |
| Example 4 | 1000 | 3H | 0.2 | 0.05 | X | 1 μm |
| Example 5 | 1000 | 3H | 0.2 | 0.03 | X | 1 μm |
| Example 6 | 1000 | 3H | 0.2 | 0.04 | X | 1 μm |
| Example 7 | 1000 | 3H | 0.4 | 0.1 | X | 0.9 μm |
| Comparative Example 1 | 1000 | 3H | 0.2 | 0.25 | ○ | 2 μm |
| Comparative Example 2 | 1000 | 3H | 0.7 | 0.1 | X | 10 nm |
| Comparative Example 3 | 1000 | 3H | 0.6 | 0.11 | X | 200 nm |
| Comparative Example 4 | 1000 | 3H | 0.2 | 0.48 | ○ | — |
| Comparative Example 5 | 1000 | 3H | 0.7 | 0.15 | X | — |
| Comparative Example 6 | 1000 | 3H | 0.6 | 0.17 | ○ | — |
| Comparative Example 7 | 1000 | 3H | 0.2 | 0.3 | ○ | — |

According to Table 1, the hard coating films of Examples 1 to satisfied that the average distance between the second inorganic particles was 500 nm to 1.5 μm, and thus they were found to have low haze and an excellent anti-blocking effect.

7. XPS (X-Ray Photoelectron Spectroscopy) Analysis

The surface of the hard coating film of Example 1 was analyzed by XPS, and the results are shown in the following Table 2.

TABLE 2

| Component | F | O | C | Si |
|---|---|---|---|---|
| Content (at %) | 12.0 | 30.9 | 49.5 | 7.6 |

According to Table 2, it was confirmed that carbon (C) and oxygen (O) which are components of the polymer binder were mainly detected on the surface of the hard coating film of Example 1, suggesting that the inorganic particles were not exposed to the outside of the hard coating film.

8. Measurement of Diameter of Inorganic Particles Using Transmission Electron Microscope (TEM)

Diameter of inorganic nanoparticles in the hardcoating film was measured by using Transmission Electron Microscopy (TEM) in the magnitude of 100,000. The hard coating film was embedded into the epoxy resin, and sliced with an ultramicrotome (thickness of 150 nm). After transferred onto a Cu grid, five images of inorganic nanoparticles were captured. The diameter of each inorganic nanoparticle of five images was measured and the average value was calculated.

The invention claimed is:

1. A hard coating film comprising a hard coating base layer, the hard coating base layer including:
   a polymer binder resin;
   first inorganic particles dispersed in the polymer binder resin and having an average particle size of 5 nm or more and less than 70 nm; and
   second inorganic particles dispersed in the polymer binder resin and having an average particle size of 70 nm to 150 nm,
   wherein a content of the first inorganic particles is 1% by weight to 4% by weight with respect to 100% by weight of the hard coating base layer,
   wherein a content of the second inorganic particles having an average particle size of 70 nm to 150 nm is 4% by weight to 12% by weight with respect to 100% by weight of the hard coating base layer,
   wherein an average value of a distance between one surface of the hard coating base layer and the center of each of the second inorganic particles in a direction perpendicular to the one surface of the hard coating base layer is 35 nm to 5.0 µm, and the second inorganic particles are adjacent to each other in a horizontal direction with respect to the one surface of the hard coating base layer and spaced apart by an average value of a distance of 0.1 µm to 1.5 µm, the distance being determined as an average of the distance between centers of one second inorganic particle and an adjacent second inorganic particle,
   wherein the second inorganic particles are dispersed in the polymer binder resin with no agglomeration,
   wherein the first inorganic particles and the second inorganic particles each consist of the same one or more reactive functional group on a surface thereof, and
   wherein the reactive functional group forms a crosslinking bond with the polymer binder resin.

2. The hard coating film of claim 1, wherein the second inorganic particles are present inside the hard coating film.

3. The hard coating film of claim 1, wherein the reactive functional group is selected from the group consisting of a (meth)acrylate group, an epoxide group, a vinyl group, and a thiol group.

4. The hard coating film of claim 1, wherein the reactive functional group is a silane compound or a hydroxide compound, each including one or more reactive functional groups selected from the group consisting of a (meth)acrylate group, an epoxide group, a vinyl group, and a thiol group.

5. The hard coating film of claim 1, further comprising a fluorine-based compound including a reactive functional group, the reactive functional group forming a crosslinking bond with the polymer binder resin.

6. The hard coating film of claim 1, wherein the first inorganic particles and the second inorganic particles are one or more selected from the group consisting of silica and a metal oxide.

7. The hard coating film of claim 1, wherein at least one surface of the hard coating base layer has at least two unevennesses, and the unevennesses have a height of 1 nm to 50 nm.

8. The hard coating film of claim 7, wherein an average distance between the unevennesses is 0.1 µm to 1.5 µm.

9. The hard coating film of claim 1, wherein a thickness of the hard coating base layer is 500 nm to 30 µm.

10. The hard coating film of claim 1, wherein in a graph of measurement of static and kinetic friction forces with a TAC(triacetyl cellulose) film measured using a Friction Tester, by:
   applying a sled bearing a load of 400 g to a surface of the hard coating film,
   pulling the sled at a test speed of 18 cm/min for a test distance of 10 cm,
   measuring the static and kinetic friction forces, and, using the measurements in the section from 3 cm to 10 cm on the graph, determining an average friction force, a maximum friction force, and a minimum friction force, and
   determining a maximum amplitude (A) as a maximum value of the absolute values of difference between the average friction force and a maximum friction force and the difference between the average friction force and a minimum friction force,
   wherein the maximum amplitude (A) measured in the section from 3 cm to 10 cm on the graph is 0.15 or less.

* * * * *